Oct. 9, 1956 P. KLAMP ET AL 2,765,506
DRUM TYPE MACHINE FOR FORMING SHELL MOLDS
Filed Feb. 21, 1951 5 Sheets-Sheet 2
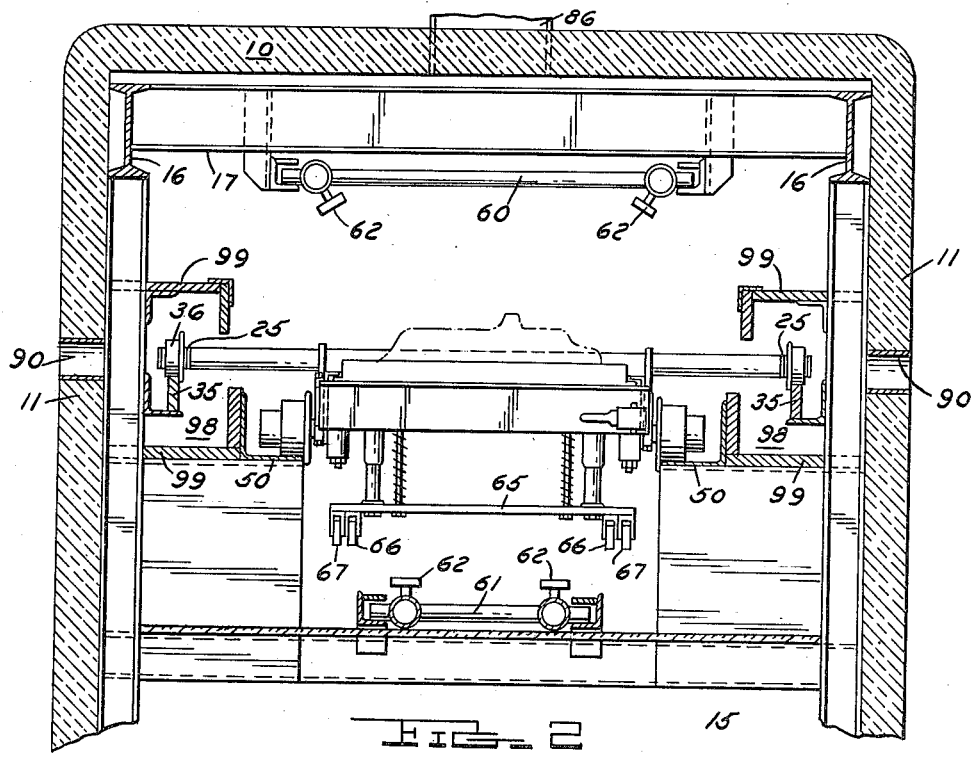
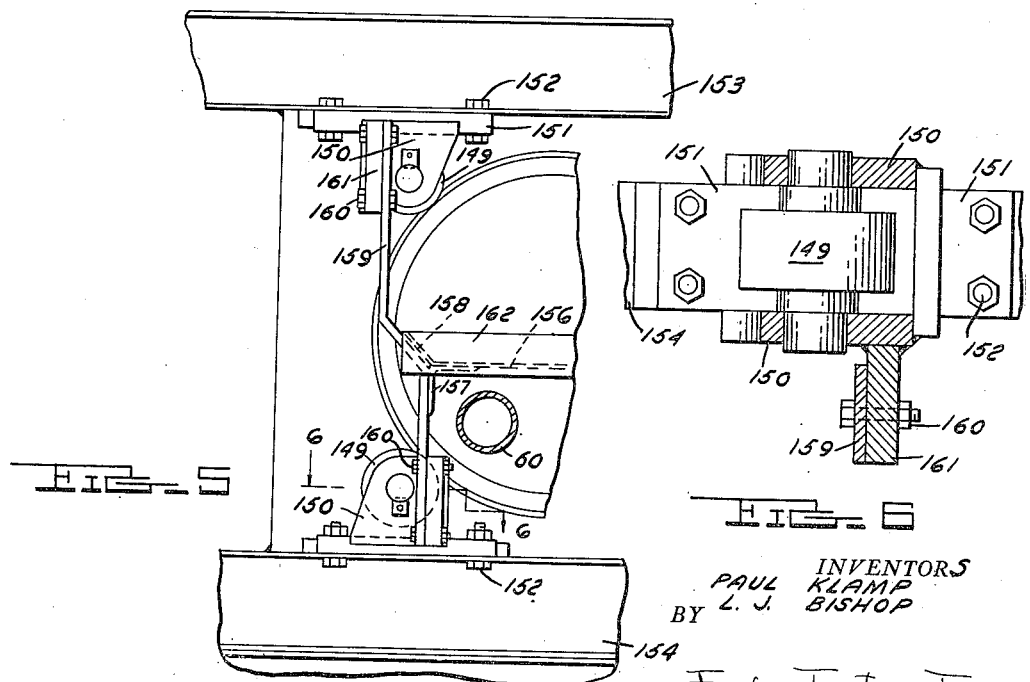
INVENTORS
PAUL KLAMP
L. J. BISHOP
BY
Farley Forster & Farley
ATTORNEYS

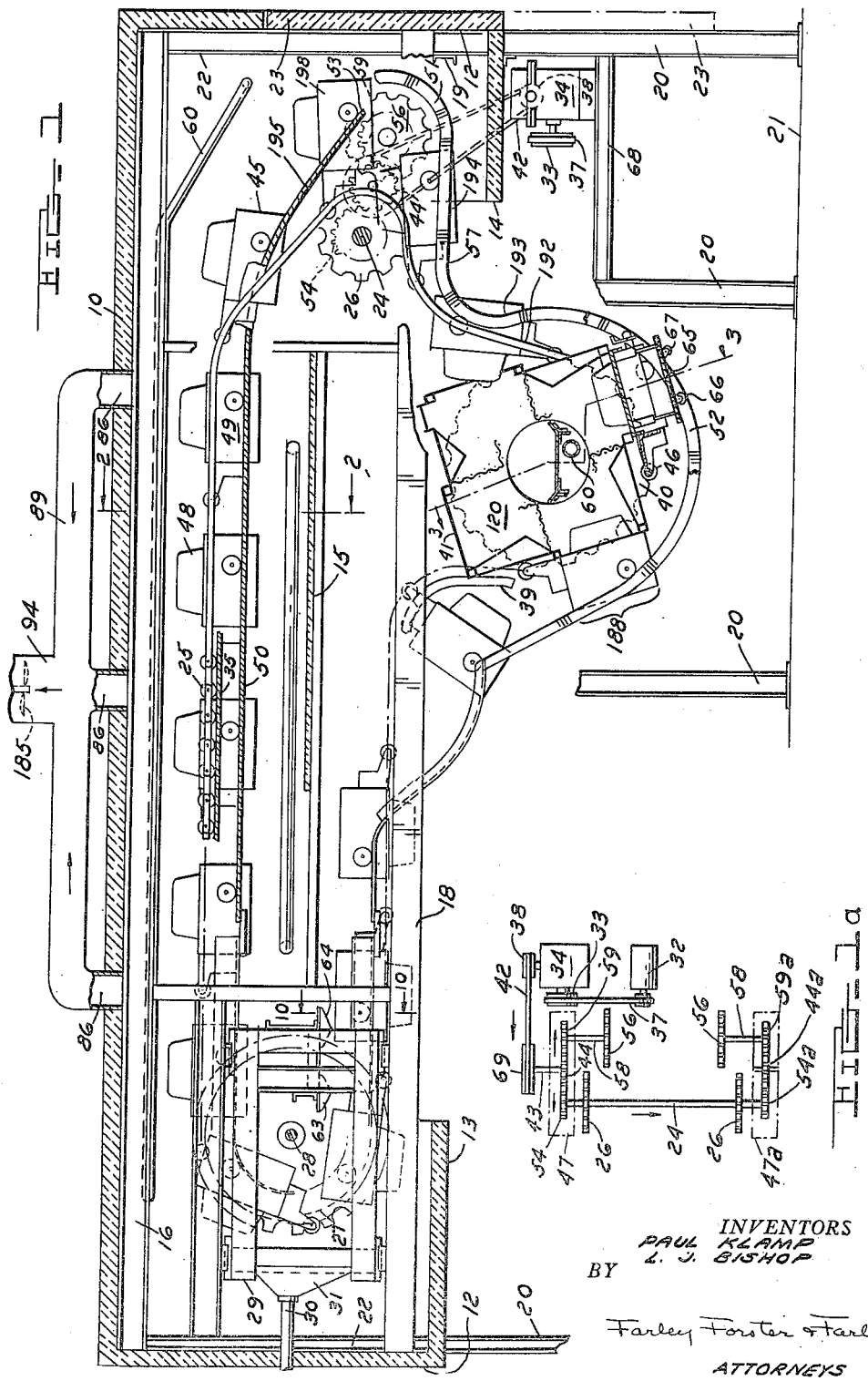

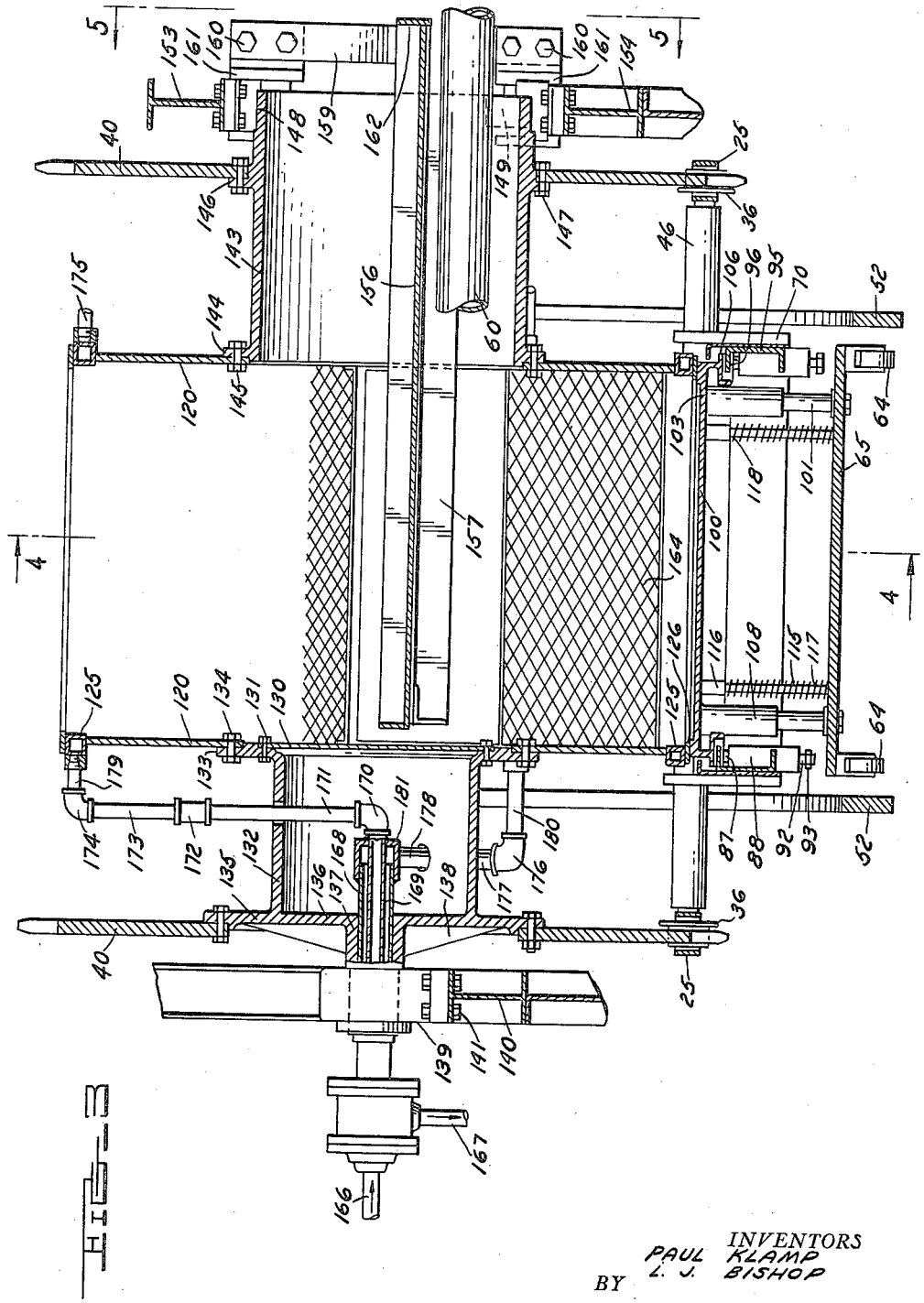

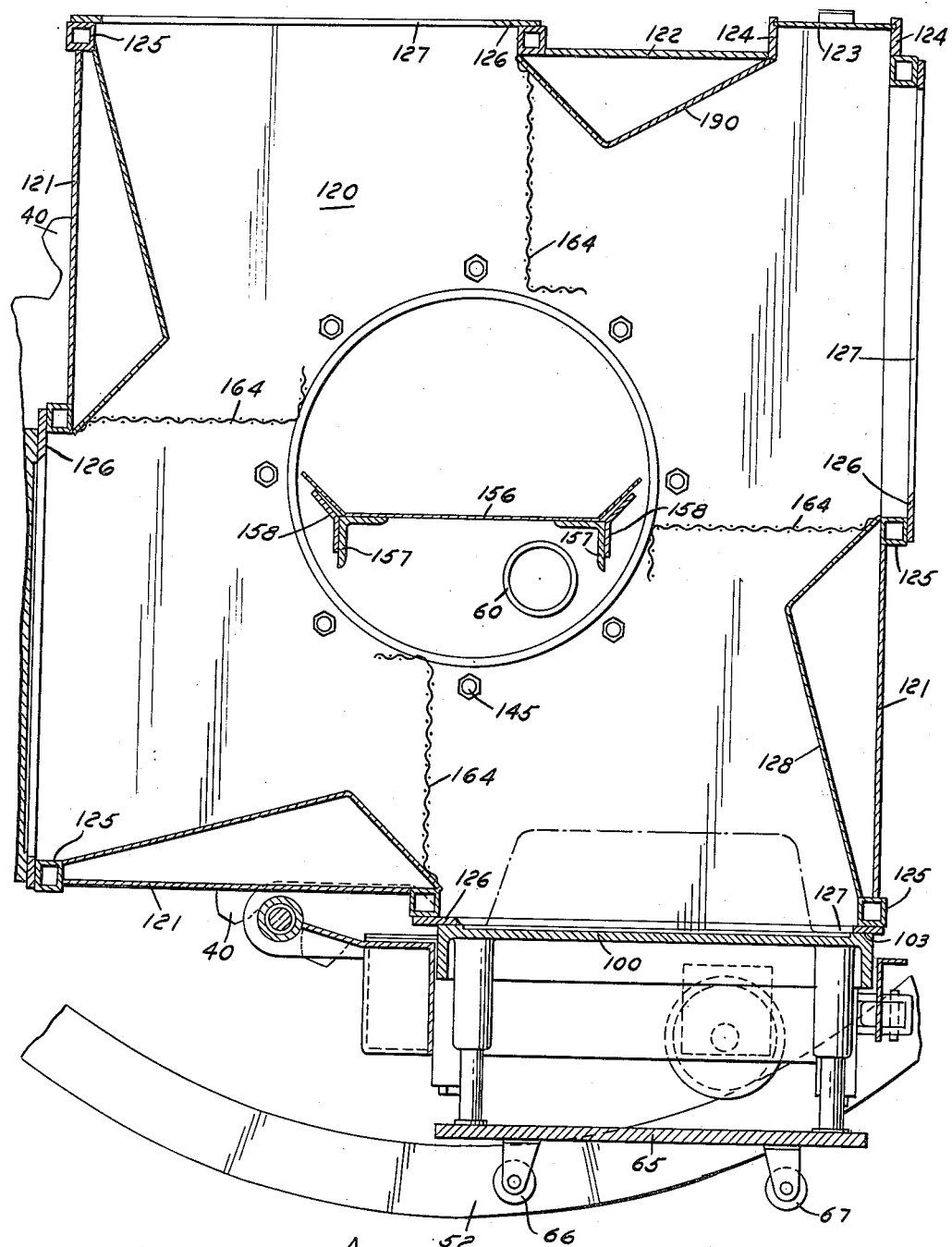

Oct. 9, 1956 P. KLAMP ET AL 2,765,506
DRUM TYPE MACHINE FOR FORMING SHELL MOLDS
Filed Feb. 21, 1951 5 Sheets-Sheet 5
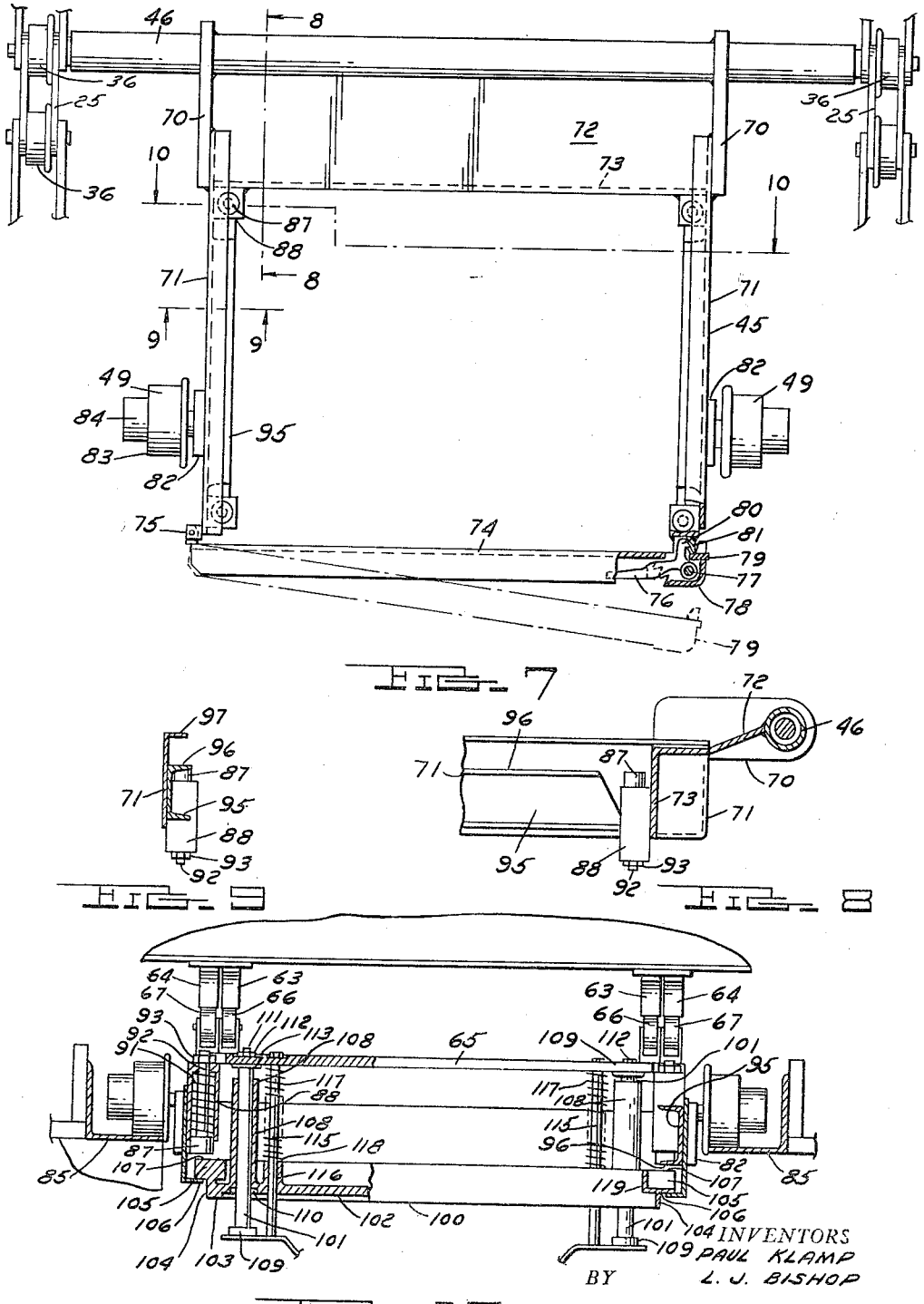
INVENTORS
PAUL KLAMP
L. J. BISHOP
BY Farley Forster + Farley
ATTORNEYS

United States Patent Office 2,765,506
Patented Oct. 9, 1956

2,765,506

DRUM TYPE MACHINE FOR FORMING SHELL MOLDS

Paul Klamp, Detroit, and Leonard J. Bishop, Birmingham, Mich., assignors to Mechanical Handling Systems, Inc., Detroit, Mich., a corporation of Michigan Application February 21, 1952, Serial No. 272,796

1 Claim. (Cl. 22—20)

This invention relates to improvements in the construction of a drum-type machine for forming molds by the foundry process known as shell molding, which process involves depositing a layer of a thermo-setting, finely powdered molding material upon a heated pattern plate. The thermo-setting material is then cured upon the pattern plate to form a shell-like mold, which is removed from the pattern plate and used in a cope or drag for forming a casting.

It has been found extremely desirable, in performing this shell molding process, to employ some form of mechanism by means of which a pattern plate could be brought to a container filled with the mold forming material, have a coating of this material deposited thereon, with the coated pattern plate then being passed through an oven to cure the thermo-setting molding material, the cured mold removed and the pattern plate then brought back to the container in a heated condition for receiving the next coating. The present invention relates to a machine for accomplishing these steps, and this machine has been designated a drum-type, due to the fact that the container, in which the finely powdered mold forming material is placed, is a rotating drum equipped with a number of faces each adapted to receive a pattern plate, these faces being open so that the material contained within the drum is deposited upon the pattern plate as the latter moves around the lower segment of the horizontal axis on which the drum rotates. Such rotating drums have been employed for many years for depositing a layer of coating material. For example, in the brick molding art, the mold is customarily coated with a layer of sand which serves as a parting agent to facilitate the removal of the wet brick from the mold. Rotating drums have frequently been employed to perform this coating operation, an early example being contained in United States Patent No. 385,790.

Consequently, the use of such a rotating drum broadly in a machine of this type constitutes no part of the present invention. Likewise, no claim of invention is made to the broad combination in the present machine of such a drum and a curing oven, for the employment of such an oven is dictated by the very nature of the shell molding process itself. The combination of a rotating drum, curing oven, and means for conveying coated patterns from the drum to the oven and back to the coating station in a continuous path also forms no part of the present invention. Such machines for continuously performing the various steps required in the shell molding process have been designed and are being employed commercially at the present time.

The present invention rather consists in certain improvements in the general arrangement of a machine of this type together with improvements in the constructional features of the component parts thereof, all of which improvements together contribute to the successful performance by the machine of its intended function. The following brief discussion of the shell molding process is included for a more thorough understanding of the nature of the steps involved and some of the critical factors which arise in the successful performance of these steps by mechanized equipment.

In the shell molding process, certain problems exist which affect the employment of a drum type container for depositing a layer of mold-forming material upon a pattern plate. The material is a very finely divided pulverant whose agitation creates a serious dust problem; this material, which contains a thermo-setting resin, will adhere to any heated surface; and, it must be kept in a very finely divided state in order that a uniform smooth coating of material will be deposited on every surface of the pattern plate. Thus, in the shell molding machine of the present invention means have been included to establish a firm positive seal between the pattern plate and the drum; to minimize and control the heat transfer from the oven and the pattern plate to the drum; and to insure the material being maintained in a finely divided state and to trap any lumps of molding material so that they will not be deposited upon any pattern plate.

Upon the completion of the operation of depositing a coating of mold forming material upon the pattern plate, a critical state exists until the time this pattern plate has passed through the oven and the mold forming material has thus been cured. Until the curing has been completed it is quite easy for the mold forming material to become dislodged from any portion of the pattern. Means have been incorporated in the present invention to bring the pattern plate to a level position as soon as possible after its removal from the rotating drum and maintain the pattern plate in this level position until the curing process has been completed.

Other improvements incorporated in the invention include a relationship between the pattern plate carrier and the drum which permits the forming of molds with a maximum amount of draw for a given size of the parts; and an improved construction of the pattern plate carrier which contributes to a proper sealing engagement between the pattern plate and the drum, and which permits the easy mounting of pattern plates upon the carrier.

An improved combination of pattern plate carrier, drum, and conveying means for mounting a plurality of carriers and propelling them into engagement with the drum, holding them in engagement with the drum, and conveying them from the drum in a controlled position through the oven, also constitutes part of the invention.

All of the foregoing improvements, and others which will be brought out in the more detailed description of the invention to follow, are disclosed in the machine illustrated in the accompanying drawings which comprise the following views:

Fig. 1, a semischematic side elevation of the machine, partly in section. This view is intended to illustrate the relationship between the essential operating components of the machine, and for the sake of clarity, many of the structural details such as a complete disclosure of supporting framework, drive mechanism and a detailed showing of each of the carriers, have been eliminated. Many of these details are brought out and their relationship will be explained in connection with other views. Other details are design features which could be supplied by anyone skilled in the art.

Fig. 1a, a schematic layout of driving mechanism for the machine of Fig. 1.

Fig. 2, a sectional view taken along the line 2—2 of Fig. 1 showing a typical cross-section through the oven portion of the machine, and illustrating a typical relationship between the operating parts thereof.

Fig. 3, a sectional view taken along the line 3—3 of Fig. 1 to show the construction of the drum element thereof.

Fig. 4, a section taken along the line 4—4 of Fig. 3 showing a side elevation of the drum construction and the relationship between the drum, a pattern plate and a pattern plate carrier.

Fig. 5, a fragmentary end view of the drum construction and mounting taken in the direction of the arrows 5—5 shown on Fig. 3.

Fig. 6, a sectional detail taken along the line 6—6 of Fig. 5.

Fig. 7, a plan view of the construction of a pattern carrier and showing the relationship between the carrier and the conveying chain.

Fig. 8, a section taken along the line 8—8 of Fig. 7.

Fig. 9, a section taken along the line 9—9 of Fig. 7.

Fig. 10, an end view, partly in section, showing the relationship between a carrier, a pattern plate assembly supported thereby, when sectioned along the line 10—10 of Fig. 7, and the various component parts when this carrier is passing the knockout station of the machine. This view can be correlated with the showing of Fig. 1 by reference to the line 10—10 indicated thereon, which line illustrates the location of the section taken through the machine to show the supporting structure illustrated in this view.

For convenience, the following detailed description of the machine will be broken down into sections. The general arrangement and major component parts of the machine will first be described, principally with reference to Figs. 1 and 2. This description will be followed by detailed descriptions of the major component parts, namely, the drum, the pattern carrier and the pattern plate assembly. The operational and constructional features of the machine resulting from the general arrangement and combination of these component parts will then be briefly reviewed.

Machine in general

A comparison of Figs. 1 and 2 will show that the machine is partially encased within a rectangular oven having a top wall 10, side walls 11, end walls 12, and a sectional bottom wall composed of left and right end portions 13 and 14, respectively, and an internal baffle 15. All these parts are composed of insulating material, the baffle 15 being thinner in cross section than the outer walls of the oven, and extending across the oven between the side walls 11 at a point above the level of the bottom wall end portions 13 and 14. The right end wall includes a downwardly movable access panel 23.

Suitable framework is provided to support the walls of the oven structure as well as the operating components of the machine. For the sake of clarity, this framework structure has not been shown in detail but the disclosure of Figs. 1 and 2 do include a skeletonized representation of a portion of the framework necessary for the proper support of the oven and operating parts. The disclosure of Fig. 2 includes a pair of upper longitudinal side beams 16 which are interconnected by a suitable number of upper cross members 17. These upper longitudinal beams 16 are supported at each end by corner upright members 22 which in turn rest upon the upper flange of a pair of lower longitudinal I beams 18, interconnected by a suitable number of cross members such as the channel member 19 shown in Fig. 1, and supported upon a series of posts 20 which extend to floor level 21.

The direct propelling members of the machine consist of a pair of roller type conveyor chains 25, which travel in a counterclockwise direction as the machine is viewed in Fig. 1, driven by a pair of driving sprockets 26 located at the right-hand end of the machine and keyed to a common cross shaft 24. The chains travel around a pair of take-up sprockets 27 which are mounted upon stub shafts 28 carried by a movable take-up framework 29. The construction of this movable framework is not shown in detail, as it follows conventional conveyor practice. Position of the take-up frame 29 is controlled by a fluid pressure operated cylinder (not shown) acting through a rod 30 connected to the movable framework 29 by a suitable bracket 31.

The path of travel of each conveyor chain is defined by a track member 35, rectangular in cross section, which engages the flanged rollers 36 of the chain. These tracks extend upwardly in the direction of travel away from the driving sprockets 26, then extend horizontally to the take-up sprockets 27 and again horizontally across a portion of the lower part of the oven. Just below the oven baffle member 15, the track turns into a downwardly directed portion 39 which trains each chain onto a sprocket 40 carried by the structure of a four-sided drum 41 which is mounted for rotation on a horizontal axis. Movement of the conveyor chain thus imparts rotary motion to the drum.

A series of equally spaced pattern carriers 45 are each connected to the pair of conveyor chains 25 by a cross bar 46, as can be seen from the enlarged showing of one of these pattern carriers contained in Fig. 7. In Fig. 1, each carrier 45 is shown supporting a pattern plate 48 having a representative deep draw form, and with the exception of the carrier in engagement with the lower face of the drum 41, the carrier construction is not given in detail except to indicate that each carrier is equipped with a pair of supporting wheels 49. The connection between each carrier and the chain is a pivotal one, and the supporting wheels 49, in addition to carrying the major portion of the weight of the carrier, define its position about the pivotal axis of attachment between the cross bar 46 and the chain. The supporting wheels 49 of each carrier travel along a pair of supporting tracks 50 located inwardly of the chain supporting tracks 35. Thus, by establishing a proper relationship between the path of travel of the chain supporting tracks 35 and the carrier supporting tracks 50, the attitude of the carrier can be controlled for proper approach of the pattern plate 48 into engagement with a face of the drum 41, to maintain a proper sealing engagement between the pattern plate and face of the drum during the passage of the carrier around the latter, and to maintain the pattern plate in a substantially horizontal position as soon as possible after leaving the drum and during its passage through the curing oven. This last function of maintaining the pattern plate horizontal is effected with the aid of a pair of supplementary sprockets 56 which are mounted on individual stub shafts 58 adjacent to the driving sprockets 26, and which engage the supporting rollers 49 of each carrier, serving to lift the carrier in approximately a horizontal position from the lower carrier supporting track section 57 onto the upper carrier supporting track section 50.

The drive for the machine imparts simultaneous rotation both to the pair of driving sprockets 26 and to the pair of supplementary sprockets 56 and is schematically shown in Fig. 1a. A motor 32 drives an input pulley 33 of a reducer 34 through a belt 37, the output pulley 38 of the reducer being connected to an input pulley 69, located on the side of the machine, by a belt 42. The input pulley 69 of the machine is secured to an input shaft 43, which also carries an input pinion 44. This shaft projects from a gear box 47 which is attached to the side of the machine and includes a pair of gears in simultaneous engagement with the input pinion 44. One of these gears, 54, is keyed to one end of the cross shaft 24, and the other gear 59 is keyed to the end of one of the stub shafts 58. A similar gear box 47a is mounted on the opposite side of the machine and includes a similar set of gears with the exception that the gear 54a secured to the opposite end of the cross shaft 24 drives the gear 59a attached to the end of the other stub shaft 58 through a pinion 44a, acting as an idler. Fig. 1 discloses that the motor 32 and reducer 34 are mounted upon supporting frame members 68 located at the right-hand end of the machine just below the bottom wall 14 of the oven. The motor and reducer are standard commercial units and the design of the gear boxes 47 and 47a follows conventional practice. Hence, these parts are not shown in detail.

A quantity of the pulverant mold forming material is contained within the drum 41 which is constructed so that the supply can be continuously maintained through the operation of a conventional type auger conveyor 60. A coating of this material is deposited upon each pattern plate, which is brought to the drum directly from the oven in a heated condition. Curing of this coating is effected in the oven which is equipped with upper and lower gas pipes 60 and 61, each carrying a series of burners 62 (see Fig. 2), and which also includes a circulation system. This system includes a number of exhaust passages 86 (see Fig. 1) located in the oven top wall 10 interconnected by a suitable manifold 89 to an exhaust stack 94. Inlet openings of the system include the two main lower openings between the oven bottom panels 13 and 15 and panels 15 and 14, together with supplementary openings 90 provided in the oven side panels 11. These supplementary openings (see Fig. 2) are located at about the level of the tracks 35 for the roller chains 25 and direct cooling air over the chains, which travel in ducts 98 formed by panels of insulating material 99. The ducts 98 thus shield the chains from the heat and also act to direct and confine the supplementary air circulation to the chains. A blower 185, schematically illustrated in Fig. 1, is preferably located in the exhaust stack 94 to control the amount of air circulation.

The carriers come off the take-up sprockets 27 in an inverted position and then pass by a knockout station defined by two pairs of wedge shaped cams 63 and 64. The construction of each pattern plate assembly includes a knockout plate 65 equipped with two pairs of rollers 66 and 67, the rollers 66 contacting the cams 63 and the pair of rollers 67 contacting the cams 64, these contacts corresponding pair of rollers are spaced laterally (see Figs. 4 and 10 in adition to Fig. 1). This contact frees the shell-like mold from the pattern plate and the carrier then passes onward to the drum to repeat the process.

Further details and additional constructional features of the machine will be found in the description of the principal operating components thereof which follows, this description beginning with the construction of the carrier, then the pattern plate assembly, and finally the rotating drum.

Carrier

The construction of the carrier is shown in Figs. 7 to 9, with additional details being illustrated in Fig. 10 which shows the carrier in assembled relationship with a pattern plate assembly. Each carrier is connected to the cross bar 46 by a pair of L-shaped brackets 70 which are welded to the cross bar in spaced relationship. An L-shaped (Fig. 9) carrier side rail 71 is connected to each of the brackets 70, and a plate 72 having a downturned flange 73 is connected between the brackets 70 and side rails 71 and to the cross bar 46. The flange 73 of the plate 72 forms the inner end wall of the carrier, as shown in Fig. 8. The front end wall of the carrier is a gate formed by a channel member 74 which is connected to the left-hand side rail 71 of Fig. 7 by a hinge 75. A latch 76, in the shape of a bell crank, is pivoted at 77 to a latch mounting member 78 carried by the swinging end 79 of the gate 74. The striker 80 of the latch 76 engages a keeper 81 secured to the right-hand side rail 71.

The carrier supporting rollers 49, each of which is mounted on a supporting bracket 82, are fastened to each of the carrier side rails 71. These rollers 49 are composed of two independently rotatable cylindrical members, one 83, of large diameter, which engages the supporting tracks, such as the track 85 shown in Fig. 10, and a second cylindrical member 84 of smaller diameter. This second cylindrical surface engages the teeth of the supplemental sprocket wheels 56 (see Fig. 1), and, when so engaged, the member 83 is free to rotate along the track sections 51 and 53 adjacent the sprocket wheels 56.

The two carrier side members 71 together with the end member 73 and end gate 74 form an open rectangular frame, dimensioned to freely receive a pattern plate assembly which is normally supported only at each of the four corners of the open frame of the carrier upon a plunger 87, slidably mounted in a supporting post 88. A sectional view of the construction of one of these plungers 87 and its supporting post 88 is given in Fig. 10, which shows that the plunger 87 is slidably mounted within a bore formed in the post 88. A spring 91 is positioned between the bottom of the bore and the underface of the plunger 87, and a stop rod 92, secured to the plunger, extends through an opening formed in the lower face of the post and receives a nut 93. This stop rod serves to limit movement of the plunger outwardly of the bore of the post 88 and the nut 93 permits the plunger to be adjusted to the proper height and the spring 91 to be preloaded to the desired extent. A channel member 95 is secured to each of the carrier side rails 71 to reinforce the latter and has its upper flange 96 positioned at a spaced distance below the inturned flange 97 of the L-shaped side rail 71 to form a slide for the support of each pattern plate assembly during its insertion into or removal from the carrier frame. Each plunger is adjusted so that the normal level of its outer surface conforms to the level of the flange 96.

Pattern plate assembly

No plan view of the pattern plate assembly is included in the drawings, since in plan the configuration of this assembly conforms to the shape of the rectangular opening defined by the side and end members of the carrier. Fig. 10 discloses the constructional details of this assembly in end elevation, and illustrates the relationship between this assembly and the carrier with the parts in inverted position.

The pattern plate assembly consists of two main elements, a pattern plate 100 and the knockout plate 65. The pattern plate 100 has an upper surface 102 on which the pattern for any particular object to be cast is formed. This surface 102 is bounded on all four sides by a raised border which forms a frame 103. Side portions 104 depend from the frame 103 and, at each corner of the frame, terminate in enlarged supporting bosses 105 which project outwardly beyond the side portions 104 to form a carrier engaging flange 106. Formed integrally with the side portions 104 and bosses 105, and extending between the latter, is an angle frame section 119 (appearing in right side of Fig. 10) which forms a continuation of the carrier engaging flange 106. The lower surface 107 of the bosses 105 is adapted to contact the plungers 87 of the carrier when the pattern plate assembly is properly positioned in the carrier, and the flange 96 of the side rails thereof, during the operation of inserting or removing the pattern plate assembly.

The knockout plate 65 is connected to the pattern plate 100 by four guide posts 101 located at each corner of the assembly and slidably engaging an elongated sleeve 108 formed with the pattern plate 100. Each guide post 101 has an enlarged head 109, adapted to fit within a recess 110 formed in the surface 102 of the pattern plate 100, the other end of the guide post being firmly connected to the knockout plate by a threaded stud 111 and nut 112. The knockout plate is engaged between the nut 112 and a shoulder 113 formed at the end of the guide post. A series of knockout plungers 115 are secured to the knockout plate 65 in a similar manner, and each slidably engage a sleeve 116 formed as part of the pattern plate 100. A number of springs 117 are employed, one mounted around each knockout plunger between the knockout plate 65 and the inner end 118 of the sleeve 116. These springs serve to return to the knockout plate from the actuated position shown in Fig. 10 to a normal position such as shown in Fig. 3, this normal position being defined by the engagement between the head 109 of the guide posts 101 and the pattern plate.

Each knockout plate 65 carries the two pair of rollers 66 and 67. One pair of these rollers is mounted on the knockout plate adjacent each end and toward the corners of that end of the plate with the pair of rollers 66 being mounted inboard of the location of the rollers 67. The lateral spacing between a roller 66 and roller 67 on one side of the pattern plate is also reflected in the location of the two pair of knockout cams 63 and 64 so that simultaneous contact may be established between all four rollers and all four knockout cams.

Rotating drum assembly

The constructional details of this assembly are shown in Figs. 3 and 4, Fig. 3 being a section taken through the rotational axis of the drum, and Fig. 4 a section taken perpendicular to the rotational axis thereof. The drum illustrated is a four-sided type and the drum structure itself consists of two end plates 120, each having four sides and a central aperture. A portion of each of three side faces of the drum is closed by a plate 121, the fourth face, which is uppermost in Fig. 4, being partially closed by a plate 122 in combination with a cleanout door 123, which is slidably carried in notches or grooves formed in cross members 124. Plates 121, 122 and the cross members 124 are connected between the end plates 120.

The construction of the remaining portion of each face of the drum is similar and consists of a frame of rectangular tubing 125 connected to the end plates 120 and to the adjacent side plates 121 and 122, or cross member 124. A rectangular sealing plate 126, formed as a frame with an internal opening 127, is secured to the outer face of each frame 125 of tubing, with contact between the drum and pattern plate 100 being established between the outer face of this sealing plate 126, and the surface of the frame portion 103 of the pattern plate 100.

In Fig. 4 the rotation of the drum in operation is counterclockwise, and a transverse baffle plate 128 is connected between the end plates 120 of the drum at each advancing corner thereof to prevent powdered material from piling up excessively in the corners.

Referring to Fig. 3, the center aperture in the left-hand end plate 120 of the drum is sealed by a cover plate 130, which is connected by bolts 131 to a cylindrical cap 132 having a flange 133 connected to the end plate 120 by a series of bolts 134. The cap 132 also has an outer flange 135 which serves as a mounting ring for the left-hand drum sprocket 40, and which extends inwardly at 136 to a hollow stub shaft 137, the shaft being formed with the end cap 132 and rigidly braced by a series of gussets 138. This shaft 137 is journaled in a conventional bearing 139 supported upon suitable framework, including a transverse member 140 to which it is connected by bolts 141.

At the right-hand end of the drum the central aperture in the end plate 120 is surrounded by another end cap 143, having an inner flange 144 which is connected to the end plate 120 by a series of bolts 145, and also having an outer flange 146 which serves as a mounting ring for the right-hand drum sprocket 40. Bolts 147 connect the sprocket 40 to the flange 146. The outer portion of the end cap 143 is machined at 148 to form a circular bearing race and, this bearing race, as shown in Fig. 5, is engaged by a number of rollers 149. In the construction illustrated, four rollers are employed to rotatably support the end cap 143, each of these rollers being journaled in a bracket which includes a pair of upright members 150 and a base 151 which is adapted to be attached to a frame member by bolts 152. One pair of the rollers 149 can thus be mounted upon each of the upper and lower horizontal frame members 153 and 154 shown in Fig. 5.

This construction of the end cap 143, and its mounting, provides a large opening for continuous access to the interior of the drum proper, and permits the employment of some means, such as the auger type conveyor 60 illustrated, for continuously replenishing the supply of pulverant material carried within the drum. This construction also permits the inclusion of means for effecting the continuous screening of the pulverant material and the removal of any lumps of excessive size. The construction employed for this purpose consists first of a removable tray 156, which extends through the mouth of the end cap 143 and into the center of the drum, and is supported upon a pair of angle iron bottom rails 157, augmented by side rail members 158. The mounting of this supporting structure for the tray 156 is shown in Fig. 5 and consists of two vertically extending Z-shaped frame members 159 to which the bottom and side rails 157 and 158 are attached, these frame members 159 being connected by bolts 160 to lugs 161 carried by the outer side plates 150 of the brackets for the rollers 149. The tray has an outer end member 162 which projects beyond the sides and bottom of the tray and by contact with the frame member 159 and bottom rails 157 prevents the tray from being inserted too far into the drum.

The interior of the drum is compartmented by four transversely extending sections of screening 164, which, as the drum rotates, continually sift the pulverant material therein. Any lumps of material not broken up by the sifting action of the screens will be conveyed thereby upwardly out of the mass of material and dropped upon the tray 156 as the drum rotates.

The drum construction includes a cooling system (see Fig. 3) comprising an inlet connection 166 and outlet connection 167, to concentric outer and inner sleeves 168 and 169 carried by the stub shaft 137. The inner sleeve 169 forms the inlet coolant passage and is connected by an elbow 170, a length of pipe 171, a union 172, a pipe 173, a second elbow 174, and a nipple 179 to one of the square tubular frames 125. An outlet connection 175 leads from the opposite side of this frame to the next frame, and these connections between the frames are repeated until all four frames 125 have been connected in series in the coolant system. An outlet connection 180 is shown leading from the last frame 125 in the series through an elbow 176, a pipe 177, a union (not shown), and a pipe 178 to a cap 181 connected to the outer sleeve 168. A coolant passage extends from this outer sleeve to the outlet connection 167.

Constructional and operational features

Many features result from the general construction of the machine and of its individual components which contribute to the successful operation of the machine and the performance of its function of forming molds for the production of castings by the shell molding process. These features will be briefly described, with emphasis placed upon the structure which contributes to their presence.

A machine of the present type is designed to achieve high volume continuous production of shell molds. Its capacity is a function of the size of pattern plates that can be received by the carriers and its rate of production is determined mainly by the size of the oven, since a certain amount of time must be allowed for the proper curing of each mold. Within the limits of pattern plate size, molds for many types of articles can be produced by the machine at one time.

A great many features arise from the construction of the carriers when related to the means provided for their propulsion and support. As pointed out in the description of the carrier construction, the cross bar 46 which establishes the point of connection between the carrier and the propelling conveyor chain is located away from the main body or receptacle of the carrier. The connection between each carrier and each conveyor chain is a pivotal one, and the cross bar 46 is located so that the pivotal axis of this connection lies substantially in the same plane as does the outer face of the pattern plate 100. The supporting wheels 49 of each carrier are secured thereto at a point near the center of gravity thereof and are positioned closely adjacent to the sides of the pattern plate supporting frame of the carrier.

As a result of this construction the main function of the conveyor chain becomes one of propelling the carriers through the machine, the function of supporting their weight being contributed principally by the supporting wheels 49 in combination with the independent tracks which they engage. This permits the position of the carrier to be positively established along all points of their path of travel by rigid tracks, with the flexible conveyor chain merely acting in a contributory way to the establishment of carrier position. Flexibility and stretch of the conveyor chains thus become a minor problem.

As the carriers approach and pass around the drum 41 the pivotal axis of their attachment with the conveyor chain established along their cross bar 46 becomes defined with relation to the open faces or sealing plates 126 of the drum by the diameter of the sprockets 40 and the location of the teeth of these sprockets. Here, the diameter of the drum sprockets 40 and the placement of their teeth is such that the relationship between the pivotal axis of each carrier and the face of the pattern plate supported thereby is maintained with respect to the sealing plates 126 of the drum in such a way that the pivotal axis is substantially in the same plane as the face of the drum opening. This means that the motion of the carrier in approaching sealing engagement with the drum, and in breaking this engagement, approaches a true hinge action, with the carrier pivoting like a door through a relatively large arc. For a given size of the parts this permits patterns of maximum draw to be brought into and removed from sealing engagement with the drum without interference, and, as the carriers are approaching the drum for sealing engagement therewith this permits the gradual application of sealing pressure to the carrier to urge the pattern plate frame face 103 into firm engagement with the sealing plate 126 of the drum.

This sealing pressure is applied to the carrier through the supporting rollers 49 in passing along the section 188 of the supporting track which will be referred to as a pressure section. The application of this sealing pressure effects a firm seal between the pattern plate surface 103 and sealing plate 126 with the aid of the resilient mounting of the pattern plate assembly upon the four supporting plungers 87 of the carrier and the supporting springs 91 for these plungers. The sealing pressure is maintained by the portion 52 of the supporting track which is concentric with the axis of rotation of the drum. The creation and maintenance of sealing pressure is aided by the fact that the carrier supporting wheels 49 are located closely adjacent to the body of the carrier, or carrier side rails 71, for this location of the supporting wheels 49 places the supporting tracks 52 in close vertical relationship to the area where sealing pressure must be created and maintained, as can be seen from the disclosure of Fig. 3.

While it has been stated that the conveyor chains have the primary function of propelling the carriers, they also play a part in establishing the position or attitude of the carriers along their path of travel through the machine, and also play a part in the establishment and maintenance of proper sealing engagement between the pattern plate and faces of the drum. Maintenance of carrier attitude, in so far as the conveyor chains are concerned, results from the fact that roller type chains are employed and the additional fact that with a chain of this type, independent tracks can be utilized to support the chain and define its path of travel along all points intermediate the sprockets of the machine. Proper functioning of the chain with respect to the sealing engagement between a pattern plate and drum face is insured by the take-up sprockets 27, which together with the movable framework 29 on which they are mounted, insures the maintenance of proper chain tension and hence the proper degree of engagement between the chain and the sprockets 40 of the drum.

The drum construction includes features which contribute to the depositing of a proper layer of mold forming material upon pattern plates continually passing through this portion of the machine. These features include the large, open mouth end cap 143 and the external roller bearings 149 therefor, which permit the insertion of means such as the auger conveyor 60 for continuously supplying material to the drum, and means such as the removable tray 156 which, acting in conjunction with the transverse screens 164 insures the proper sifting of material supplied to the drums and the removal of any objectionably large particles or impurities therefrom. The ability to continuously supply material to the drum means that the amount of material in the drum can be uniformly maintained at a level where proper coating of the patterns is effected, and also results in reducing the dust problem.

If for any reason it becomes necessary to clean out the drum, the sliding door 123 can be removed, and all material will fall out of the drum as its rotation continues. The baffle plate 190 acts to funnel material through the cleanout opening, and also performs the same function as the baffle plates 128 when the cleanout opening is closed—that of insuring a better distribution of material in the drum, the elimination of pockets of material in the corners, and the consequent depositing of a uniform layer of material over the surface of the pattern plate.

As was mentioned in the introductory portion of the specification, one of the properties of the mold forming material employed in the shell molding process is that of adhering to a hot surface. Thus, any machine designed to accomplish continuous shell molding must include features which minimize the transfer of heat to all parts contacted by the mold forming material other than the pattern plates themselves. Otherwise, a coating of material will quickly build up on these parts to interfere with their proper functioning and require that the machine be shut down in order that they may be cleaned. No trouble will be encountered from this source as long as the temperature of the parts is kept below the temperature at which the resin component of the mold forming material becomes tacky and adhering.

Several features of the present machine contribute to achieve this desired result. The most critical condition is of course encountered on the sealing plates 126 of the drum faces, for as long as nothing is allowed to interfere with the creation and maintenance of a proper seal between these plates and the surface 103 of the pattern plate the mold forming material will be confined to the drum and its deposit confined to the molding surfaces of the pattern. Positive control of the temperature of these sealing plates is therefore obtained in the present machine through the tubular construction of the supporting frames 125 upon which the plates 126 are mounted, and the system for cooling these frames. Circulation of coolant through the frames 125 by the means previously described will prevent the temperature of the sealing plates 126 from rising to an objectionable degree, and will also prevent the transfer of heat from the hot pattern plates to the sealing plates and thence to other parts of the drum.

The general arrangement of the machine also contributes to the elimination of difficulties arising from excessive heating of parts subjected to contact with the mold forming material, and is also such that heating problems generally for a machine of this type are minimized. The positioning of the drum below and separate from the oven is important in that heat transfer from the oven to the drum parts is minimized. Also contributing to this result is the arrangement of the oven with the bottom heat confining surface 15 thereof located above the drum. As a result of this relationship between the drum and the oven, the openings through which the carriers pass from the oven to the drum and from the drum to the oven, are in the bottom of the oven so that the amount of heat losses from the oven through these openings is naturally minimized, due to the tendency of hot air to rise, with consequent reduction in the amount of heat transfer from the oven to the drum.

This natural circulation is augmented in the machine by the positive means provided for exhausting air from the oven. With the blower 185 operating, air is forced out of the exhaust stack 94 and withdrawn from the oven through the exhaust passages 86, carrying with it any objectionable fumes from the curing process, and also causing the air so withdrawn to be replaced by air entering the oven through the bottom openings adjacent to the drum. Transfer of heat to the drum by convection is thus positively prevented. At the same time, this air circulation through the oven is employed, in conjunction with the oven construction including the supplementary side openings 90 and ducts 98 for the conveyor chains 25, to prevent the chains from becoming heated to a temperature at which any mold forming material would adhere to them. Naturally, the chains are perhaps the most critical of the operating parts of the machine. Their flexibility must be maintained for proper operation and, during that portion of their travel around and adjacent to the rotating drum, they are exposed to any mold forming material dust that might be present. As long as the chain temperature is kept below that temperature at which the resin in the mold forming material will melt, the presence of such dust will present no problem in chain operation, and such temperature control of the chains is accomplished through the foregoing features.

One other feature of the machine contributes to its successful operation with this desirable relationship between the location of the oven relative to the drum. This relation, of course, requires that the carriers ascend into the oven after passing around the drum, and this portion of the travel of the carriers is most critical, because of the fact that until the carriers reach the oven and the curing of the molding material begins, no positive bond exists in the material itself and it is easily displaced from its proper position on the surfaces of the pattern plate. The compound mounting of each carrier, that is, its pivoted connection to the conveyor chain in combination with its support by the rollers 49, enables carrier movement and attitude to be precisely controlled during this critical period to achieve a minimum probability of displacement of the mold forming material from the pattern surfaces upon which it has been deposited. The chain supporting track section 192 and carrier supporting track section 193 which define the withdrawing movement of the carrier from the drum are arranged to impart a gradual swinging movement of the carrier from a substantially vertical position at the initial stage of withdrawal, to a level or horizontal position such as is assumed by the carrier 194 in Fig. 1. Such a horizontal position will provide maximum insurance against displacement of the mold forming material from the pattern surfaces in the case of most patterns, and therefore means are provided in the form of the supplementary sprockets 56 and the section of the supporting track 195 to raise the carrier under the direct heat of the oven burners in this horizontal position.

Another desirable feature resulting from the horizontal position to which the carriers are brought after leaving the drum and in which they are lifted into the oven is that a loading station for the machine is provided at the supplementary sprocket 56 and the track sections 53. The utility of the machine, as a tool for volume production, is naturally increased greatly by the fact that a pattern plate assembly can be quickly inserted in a carrier of the machine or removed therefrom. Pattern plate assemblies for a machine of this type are relatively heavy articles; if one is replaced while the machine is in operation the pattern plate assembly being removed is in a heated condition, and a replacement assembly must be preheated. These factors make a pattern plate assembly a relatively difficult object to handle, but these difficulties are minimized by placing the carrier in a substantially level position at the loading station, for in this position the carrier end gate can be easily opened and the pattern plate assembly removed by sliding motion along the supporting plungers 87 and flanges 96 of the carrier side members. With the oven end panel 23 moved to its downward open position to provide access to the loading station, a pattern plate assembly on any carrier in a horizontal position, such as the carrier 198 in Fig. 1, can be easily removed. The machine would be momentarily stopped to perform this operation, but the swinging end gate 74 of the carrier and sliding engagement between the pattern plate and carrier makes the removal and replacement of a pattern plate assembly so quick and simple that the machine does not have to be stopped long enough to interfere with the proper curing of molds on carriers then passing through the oven.

It is expected that many designs of specialized machines will be developed to form molds for the high volume production of a wide variety of articles under the shell molding process, and that problems arising in the production of particular types of castings may necessitate changes from the specific construction of the machine disclosed herein. Such changes would of course include variations in obvious details such as the number of pattern carriers employed, the number of pattern engaging faces of the drum, and consequently the exact path of movement of the pattern carriers for proper approach to and removal from the faces of the drum. These and other changes and modifications are within the scope of the present invention if embraced in the definitions thereof contained in the appended claim.

We claim:

A rotatable container for applying a coating of pulverant material to an article to be coated therewith, said container including a receptacle portion having a plurality of openings in the side walls thereof, each opening adapted to be covered by an article to be coated; characterized by said container including a frame, means for supporting said container upon said frame for rotation about a substantially horizontal axis, said means including a hollow stub shaft projecting from one end of said container and communicating with the receptacle portion thereof, a bearing surface provided on the external surface of said stub shaft, means carried by said frame for engaging said bearing surface, and means for the continuous screening and conditioning of pulverant material carried within said receptacle comprising at least one member of mesh-like material positioned within said receptacle radially outwardly from the center of said shaft and adapted to screen the material in said receptacle upon rotation of said container, a tray projecting into said receptacle through said hollow stub shaft, and means for fixedly supporting said tray from said frame, said tray extending substantially along the entire length of said mesh-like member and inwardly of the inner edge thereof whereby material collected by said mesh-like member will be deposited upon said tray as said member passes above the tray during rotation of said container.

References Cited in the file of this patent

UNITED STATES PATENTS

| | | |
|---|---|---|
| 1,027,115 | Fahnestock | May 21, 1912 |
| 1,127,113 | Thiemann | Feb. 2, 1915 |
| 1,448,203 | Cumfer et al. | Mar. 13, 1923 |
| 2,266,786 | Mitchell | Dec. 23, 1941 |
| 2,317,574 | Williams | Apr. 27, 1943 |
| 2,518,040 | Mann | Aug. 8, 1950 |
| 2,552,194 | Lindsay et al. | May 8, 1951 |
| 2,630,608 | Granath | Mar. 10, 1953 |

OTHER REFERENCES

The Foundry, October 1950, pages 162, 164 and 168.